Figure 1:
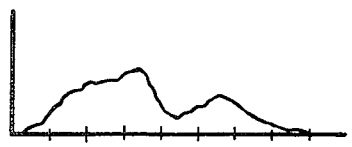
Figure 2:
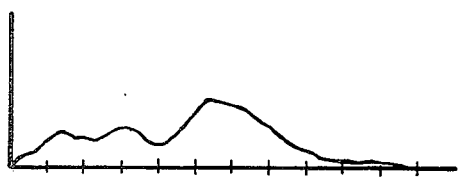
Figure 3:
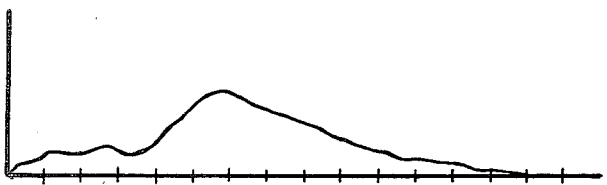
Figure 4:
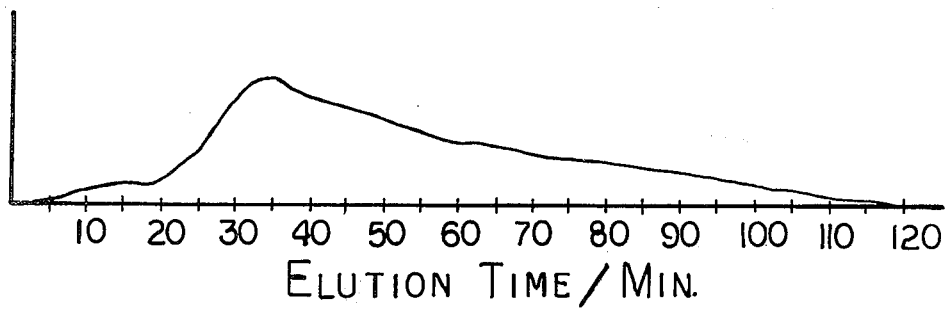

United States Patent [19]

Gauthier et al.

[11] 4,377,676

[45] Mar. 22, 1983

[54] NON-PRECONDENSED SILICONE-ALKYD RESINS AND A METHOD FOR THEIR PREPARATION

[75] Inventors: Laura A. Gauthier, Midland, Mich.; Gary E. LeGrow, Madison, Ind.

[73] Assignee: Dow Corning Corporation, Midland, Mich.

[21] Appl. No.: 304,724

[22] Filed: Sep. 23, 1981

[51] Int. Cl.$^3$ .......................... C09D 3/64; C09D 3/82
[52] U.S. Cl. .................................. 528/26.5; 106/264; 260/404.8; 524/247; 524/251; 524/588; 524/837; 524/838; 524/845
[58] Field of Search ........................ 528/26, 26.5, 901; 524/837, 838, 845, 247, 251, 588; 106/264; 260/404.8

[56] References Cited

U.S. PATENT DOCUMENTS

| T941,003 | 12/1975 | Davis et al. | 528/26 |
| 2,584,340 | 2/1952 | Goodwin et al. | 528/26 |
| 2,584,341 | 2/1952 | Goodwin et al. | 528/26 |
| 2,584,343 | 2/1952 | Goodwin et al. | 528/26 |
| 2,584,351 | 2/1952 | Hunter et al. | 528/26 |
| 2,587,295 | 2/1952 | Doyle et al. | 528/26.5 |
| 2,718,508 | 9/1955 | Rauner | 528/26 |
| 4,035,332 | 7/1977 | Gomyo et al. | 524/858 |
| 4,045,392 | 8/1977 | Callahan et al. | 260/404.8 |
| 4,069,178 | 1/1978 | Mikami et al. | 260/404.8 |

FOREIGN PATENT DOCUMENTS 723221 12/1965 Canada ................................. 528/26

Primary Examiner—Ronald W. Griffin
Attorney, Agent, or Firm—Robert L. McKellar

[57] ABSTRACT

This invention discloses silicone-alkyd resins and a method for their preparation which overcomes prior art problems in the manufacture of such resins. The method consists of reacting all of the components of the silicone-alkyd resin together essentially simultaneously.

44 Claims, 8 Drawing Figures

ELUTION TIME / MIN.

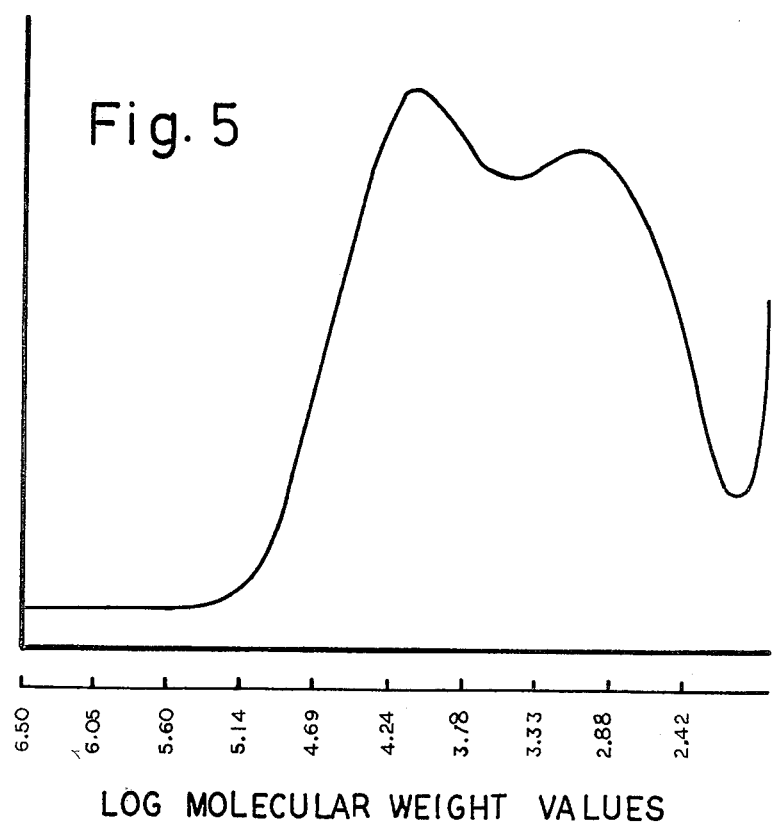
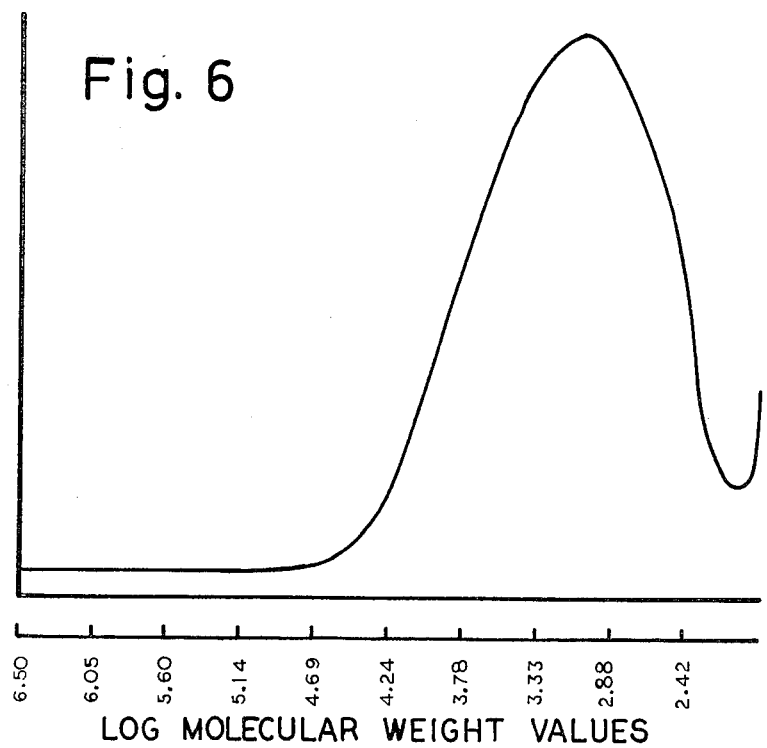

LOG MOLECULAR WEIGHT VALUES

LOG MOLECULAR WEIGHT VALUES

NON-PRECONDENSED SILICONE-ALKYD RESINS AND A METHOD FOR THEIR PREPARATION

BACKGROUND OF THE INVENTION

This invention relates to a process for the preparation of stable, silicone-alkyd copolymers which are useful intermediates in the preparation of paints.

Alkyd resins have been used successfully as intermediates for formulating outdoor paints, however, their weatherability is poor which requires reapplication of the paints after a short period of time.

In order to improve their weatherability, alkyd resins have been modified with silicones by blending or co-reacting. Better physical properties of the co-reacted silicone modified alkyds led to the extensive use of such materials as intermediates for paints.

The trend towards the use of silicone modified alkyds resulted in a number of processes by which the silicone-modified alkyds could be co-reacted. Some of these processes have been patented.

Typically, special care must be taken in the manner in which the alkyds and the silicones are brought together in order to prevent gellation of the materials. Two step and three step processes have evolved which may be considered to be the standard by which silicone modified alkyds are prepared.

For example, Goodwin et al. in U.S. Pat. No. 2,584,340, issued Feb. 5, 1952, describes a two step process in which a silane is first co-reacted with a glycerine ester and the resulting silane-glycerine ester is further reacted with a dibasic acid or anhydride. A similar two step process is disclosed in U.S. Pat. No. 2,584,351, issued Feb. 5, 1952, wherein an organosilane is condensed with a polyhydric alcohol and the condensation product is then reacted with a polycarboxylic acid or its anhydride.

A further two step process is disclosed in British Pat. No. 740,265, published Nov. 9, 1955, wherein a mixture of a fatty acid mono-ester of a polyhydric alcohol and a free polyhydric alcohol are partly esterified by using one or more polycarboxylic acids or ester-forming derivatives of such acids. Thereafter, the remaining alcohol groups are condensed with bi- or tri-functional organosilane monomers having alkoxy groups. A similar approach can be found in Canadian Pat. No. 504,115, issued July 6, 1954.

Canadian Pat. No. 504,830 deals with a silicone modified alkyd which is prepared by pre-forming the alkyd and then co-reacting it with a silanol functional polysiloxane. Thus, there are three steps involved in such a preparation. U.S. Pat. No. 3,015,637, issued Jan. 2, 1962, deals with the type of three step reaction set forth above and in addition discloses that the condensation of the pre-formed alkyd and the polysiloxane can be enhanced by the use of titanium or zirconium compounds as catalysts.

U.S. Pat. Nos. 3,945,957 and 3,948,827, issued Mar. 23, 1976 and Apr. 6, 1976, respectively, disclose a dry planographic ink composition which is prepared from a silicone modified alkyd resin which has been prepared by pre-forming the alkyd and then condensing the alkyd with an organopolysiloxane.

Finally, there is disclosed in U.S. Pat. No. 4,069,178, issued Jan. 17, 1978, that the troublesome gellation that often occurs with the heretofore mentioned processes can be overcome by a special process wherein the major portion of the carboxylic groups which are required in the alkyd are not introduced until the final step of the process.

All of the disadvantages of the prior art methods have now been overcome by the use of the process of the instant invention whereby the ingredients necessary to form a silicone modified alkyd are all reacted together at the same time without the necessity of preforming either the alkyd or the silicone. The inventive process described below prevents the gellation problems often encountered in the above-mentioned prior art processes and yet the process provides silicone modified alkyd resins which have excellent organic solvent and water resistance in the cured form and also excellent weather resistance and gloss retention.

The resins prepared by the process of this invention have much narrower dispersity of molecular weights than the resins prepared by the prior art methods.

THE INVENTION

This invention deals with a novel one step process for preparing stable, silicone modified alkyd resins which are useful in preparing formulated paints.

The susceptibility of the co-reactants in the preparation of a silicone modified alkyd to gel is highly dependent on the form of the silicone compound used and the manner in which the co-reactants are brought together. As a result, the alkyd is usually preformed by co-reacting polyalcohols and carboxylic acids or anhydrides and then the alkyd is further reacted with some form of silicone such as silanol functional or alkoxy functional polysiloxanes. Occasionally, as can be observed from the prior art discussion above, monomer silanes, usually alkoxy, acyloxy or chlorosilanes are used. When the monomer silanes were used, however, it was believed that they had to be pre-reacted with the carboxy groups of dibasic acids or anhydrides before they could be coupled with the alcohols of the alkyd or, it was believed the silane monomers had to be coupled with the alkyd after the alkyd had been formed. U.S. Pat. No. 4,035,332, issued July 12, 1977 and assigned to Shin-Etsu Chemical Co., Tokyo, Japan, disclosed that silicone modified alkyds could be prepared in a true one-shot process. In that U.S. patent, it was disclosed that water-soluble silicone modified resin compositions could be prepared by reacting the polyols, polybasic acids and alkoxy or hydroxy containing organosilicon compounds together simultaneously. The procedure found in the Shin-Etsu patent is a novel departure from the standard techniques used in the silicone modified alkyd processing art discussed above; the novelty residing in the fact that heretofore it was believed that co-reacting all of the ingredients of a silicone modified alkyd simultaneously would result in a gelled product.

The inventors herein have discovered that by utilizing certain silane monomers in a certain process they can produce silicone modified alkyd resins which have excellent properties when cured.

Thus one aspect of the invention herein is a process for producing a resin which comprises contacting and reacting essentially simultaneously (A) an aliphatic polyhydric alcohol or a mixture of aliphatic polyhydric alcohols; (B) a polybasic carboxylic acid or an anhydride or mixtures thereof; (C) an organosilane or a mixture of organosilanes having the general formula $R_nSi(OR')_{4-n}$ wherein R is selected from a group consisting of phenyl, methyl, ethyl, propyl and butyl radicals; R' is an alkyl radical of 1-4 carbon atoms and n has a value of 1 or 2 and, (D) at least a stoichiometric amount of water based on the amount of —(OR') present in the mixture, at a temperature greater than 25° C. for a period of time sufficient to produce a resin with an acid value of 10-150.

A further aspect of the invention disclosed herein are the resins prepared by the above described inventive process.

Another aspect of the invention disclosed herein are water-reducible resin compositions which have utility in paint formulations which resin compositions comprise (a) from 20 to 90 parts by weight of a resin which is produced by contacting and reacting essentially simultaneously (i) an aliphatic polyhydric alcohol or a mixture of aliphatic polyhydric alcohols; (ii) a polybasic carboxylic acid or an anhydride or mixtures thereof; (iii) an organosilane or a mixture of organosilanes having the general formula $R_nSi(OR')_{4-n}$ wherein R is selected from a group consisting of phenyl, methyl, ethyl, propyl and butyl radicals; R' is an alkyl radical of 1-4 carbon atoms and n has a value of 1 or 2 and, (iv) at least a stoichiometric amount of water based on the amount of —(OR') present in the mixture, at a temperature greater than 25° C. for a period of time sufficient to produce a resin with an acid value of 10-150; (b) 80-10 parts by weight of a water-miscible organic solvent selected from a group consisting of aliphatic alcohols, glycols, monoalkyl ethers of glycols and ketones; and (c) a basic compound selected from the group consisting of trimethylamine, triethylamine, dipropylamine, dimethylethanolamine, diethylethanolamine, triethanolamine and ammonia in an amount sufficient to reduce the acid value of the composition to below 10.

Essentially, the starting materials which are used to prepare commercial alkyds are those intended for use in this invention.

Thus, component (A) of the resin is an aliphatic polyhydric alcohol wherein polyhydric means two, three, four or more carbinols per molecule of alcohol. Occasionally, alcohols containing only one carbinol per molecule can be used but only in small amounts, i.e. less than 5 weight percent, and only when certain properties in the final resin are desired. Preferred for this invention are such alcohols as pentaerythritol, trimethylolethane, trimethylolpropane, 2,3-dimethyl-1,3-propane diol, ethyleneglycol, propyleneglycol, trimethyleneglycol, glycerin, 1,4-cyclohexanediol, tetramethyleneglycol, 1,4-cyclohexanedimethanol, hexamethylenediol, 2-methyl-2-ethyl-1,3-propanediol, 2,2,7,7-tetramethyl-1,8-octamethylenediol, 1,2,6-hexanetriol, sorbitol, diglycerine and tris(2-hydroxyethyl)isocyanurate.

Especially preferred for this invention are 1,4-cyclohexanedimethanol, trimethylpentanediol, trimethylolpropane, pentaerythritol and glycerine.

Component (B) of this invention is any dicarboxylic acid or anhydride or mixtures thereof which are commercially used for alkyds. Preferred for this invention are such dicarboxylic acids or their anhydrides as phthalic acid, phthalic anhydride, terephthalic acid, isophthalic acid, 2,6-naphthalenedicarboxylic acid, succinic acid, glutaric acid, adipic acid, sebacic acid, tetrahydrophthalic acid, tetrahydrophthalic anhydride, trimellitic anhydride, hexahydrophthalic anhydride,

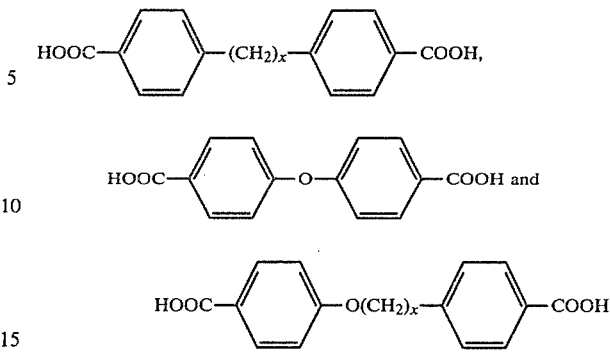

where x is an integer of 1 to 10.

Especially preferred for this invention are isophthalic acid and trimellitic anhydride. It should be understood that the resins of this invention can be modified with drying oil fatty acids. Drying oil fatty acids can be any drying oil fatty acid that is commercially used in oil modified alkyds. Preferred for this invention are fatty acids such as tall oil fatty acid, soybean oil fatty acid, castor oil fatty acid, dehydrated castor oil fatty acid, coconut oil fatty acid, linseed oil fatty acid, tung oil fatty acid, fish oil fatty acid, olive oil fatty acid and cotton seed oil fatty acid.

Especially preferred for this invention is dehydrated castor oil fatty acid.

Component (C) of this invention is an alkoxy silane or a mixture of alkoxysilanes having the general formula $$R_nSi(OR')_{4-n}$$

wherein R is selected from a group consisting of phenyl, methyl, ethyl, propyl and butyl radicals; R' is an alkyl radical having 1-4 carbon atoms and a has a value of 1 or 2. These silanes are commercially available and it is not believed that a method for their preparation is required herein.

Preferred for this invention are the methoxy and ethoxy silanes. Especially preferred are the methoxy silanes wherein a is 1 or 2 and the R group is elected from phenyl, methyl and propyl or mixtures thereof. Such silanes are for example $CH_3Si(OCH_3)_3$, $(CH_3)_2Si(OCH_3)_2$, $C_6H_5Si(OCH_3)_3$, $(C_6H_5)_2Si(OCH_3)_2$, $CH_3CH_2CH_2Si(OCH_3)_3$, $(CH_3CH_2CH_2)_2Si(OCH_3)_2$, $CH_3Si(OCH_2CH_3)_3$, $(CH_3)_2Si(OCH_2CH_3)_2$, $C_6H_5Si(OCH_2CH_3)_3$, $(C_6H_5)_2Si(OCH_2CH_3)_2$, $(C_6H_5)(CH_3)Si(OCH_3)_2$, $(C_6H_5)(CH_3)Si(OCH_2CH_3)_2$ and mixtures thereof.

Generally, the components are present in certain amounts such that the ultimate properties of the silicone modified alkyd resin both as an uncured and as a cured material are variable.

The amount of component (A) used in this invention is dependent on the amount of (B) that is used and also the type of material that component (B) is required to be. The amount of component (C) that is required depends on the final properties desired in the resin. Generally, enough component (C) is used such that the final resin contains 10-80 percent by weight of silicone. Preferably, the final resin contains 30-50 weight percent of silicone. For purposes of this invention, 90-20 percent by weight of the total amount of component (A) and component (B) are reacted with the silicone. Preferred is 70-50 percent by weight. As mentioned above, drying oil fatty acids can be used in this invention. Also, small amounts of monobasic carboxylic acids can also be used herein.

As mentioned above, component (C) is preferably a mixture of silanes. Mixtures of silanes allow one to tailor the properties of the final resin. Mixtures of silanes, for example, can be $C_6H_5Si(OR')_3$ and $CH_3(CH_2)_2Si(OR')_3$; $C_6H_5Si(OR')_3$ and $(C_6H_5)_2Si(OR')_2$; $C_6H_5(CH_3)Si(OR')_2$ and $CH_3Si(OR')_3$ and, $C_6H_5Si(OR')_3$ and $CH_3Si(OR')_3$. Thus, there does not appear to be any combination that cannot be made within the ambit of the groups described for the above formula. Thus, any combination of substituted groups in any ratio can be used in this invention as long as the average degree of substitution on the silicon atoms by organic groups is at or near 1.0. Desirable materials have a degree of substitution as close to 1.0 as possible because the cure of the final resin is enhanced. Conversely, the closer one formulates to resins having a degree of substitution less than 1.0, the more tendency the resin has to gel.

The resins can be prepared with or without organic solvents. Preferred organic solvents are xylene and toluene. When the resin is desired to be essentially solvent-free, then one only need to add a small amount of solvent at the beginning of the reaction in order to azeotropically remove by-produced water and then the small amount of organic solvent can be strip-distilled at the end of the reaction. Because such small amounts of organic solvent are required, their removal from the reaction mass is relatively simple and easy.

Component (D) of this invention is critical in order to enable one to prepare the compositions of this invention. The presence of component (D) allows for the hydrolysis of the component (C) during the early stages of the reaction and thus contributes towards the narrow dispersity of the molecular weight of the resulting resin. Reactions carried out where the components are all mixed together from the start but which do not contain component (D) at the levels specified herein result in a wider dispersity of molecular weights. The narrow dispersity of molecular weights enhances the properties of the resins produced by the inventive process. Occasionally, it may be preferable to prepare the silicone alkyd resin and treat the resin with a carboxylic acid or acid anhydride in order to introduce carboxylic acid groups into the final resin or to enable the incorporation of higher mole percentages of $CH_3SiO_{3/2}$ in the presence of $C_6H_5SiO_{3/2}$. This is done by merely adding the acid or anhydride and cooking at azeotrope temperatures for a short period of time.

The reaction to prepare the resins is carried out, generally at atmospheric pressure, by combining all of the components and heating to a temperature of about 90° C. For purposes of this invention, it is generally not desirable to heat the reaction mass at temperatures in excess of 250° C. During the period time that the reaction is heated from 25° C. to about 90° C., the component (D) hydrolyzes the alkoxysilanes and the condensation of the hydroxy groups thus formed begins. When organic solvents are present, the temperature is regulated by the azeotrope temperature of the organic solvent and the by-produced water. Generally preferred is a temperature of 150°–200° C. Occasionally, if the particular carboxylic acid or anhydride does not give the reaction mass enough acidity to cause a rapid hydrolysis of the alkoxysilanes, small amounts of mineral acids can be added, for example, dilute aqueous hydrochloric acid.

The components are combined and the hydrolysis of the alkoxy groups on the component (D) begins immediately and continues while the reaction mass is being brought to reaction temperature. The alcohol produced by the hydrolysis of the alkoxy silanes is generally the first product to distill followed by the solvent-water azeotrope. The reaction mass is heated, water produced by the condensation reaction is continually removed by the azeotrope and the heating is continued until an acid value of 10 to 150 is obtained. As indicated above, at this point additional carboxylic acids or anhydrides can be added. Additional solvents can be added at this point if desired. Upon cooling, the resins are viscous but pourable and are usually clear water white or slightly clear yellow in color.

The resins at this point are ready to use. For water reducible systems, the resins are usually dissolved in water and a water soluble or water miscible solvent and then treated with basic compounds such as amines or ammonia to neutralize the acids present and make the resin more water soluble. Such compounds suitable for this invention are ammonia and those amines such as trimethylamine, triethylamine, tripropylamine, dipropylamine, dimethylethanolamine, diethylethanolamine and triethanolamine.

Water-miscible or water soluble organic solvents useful in this invention include aliphatic alcohols, glycols, monoalkyl ethers of glycols and ketones. Specific examples of such solvents are methanol, ethanol and propanol, ethylene glycol, propylene glycol and diethyleneglycol, ethyleneglycol monomethyl ether, tetrahydrofuran, acetone, methylethylketone and dimethylacetamide. Such solvents can be mixed.

For purposes of this invention, the water reducible resin is present in the inventive composition at 20 to 90 parts by weight. The water-miscible or water soluble organic solvent is present in 80 to 10 parts by weight and the amount of basic compound present is dependent on the amount of acid in the resin. Thus, enough basic compound must be added to the composition to essentially reduce the acid value below 10. Water is then added to adjust to the proper solids content.

The resin, solvent, water and basic compound are simply blended together. The compositions are then ready for use. The compositions can be treated with those adjuvants normally used in paint manufacture or they can be used as clear coatings.

The following examples serve to illustrate the invention and should not be construed as limiting the scope of the invention.

Acid numbers herein are titrated acid numbers using dilute standardized KOH as the titrant and phenophthalein as the indicator.

Weight loss and percent non-volatile material determinations were carried out by weighing known quantities of the polymers in aluminum moisture cups and heating for 3 hours at 135° C. and determining the difference in the weight of the cup and resin before and after the heat treatment.

The viscosities of the resins are reported in Pascal Seconds (Pa.s) by mathematical conversion of centipoise derived from a Brookfield viscometer reading.

Paints made from the modified resins were evaluated for T-bend flex, T-bend adhesion, 20° and 60° gloss, hardness, tack-free time, tape test and water-spotting.

These properties were compared against prior art resins.

T-bend Flex and Adhesion

An aluminum panel is coated, cured and is bent over itself, using the panel thickness as the mandrel diameter. The number of panel thicknesses the panel has been bent over itself is the number of T-bends. The first bend, in which the panel is simply bent 180° C., is called OT, and the bend becomes less severe as more thicknesses intervene, to form 1T, 2T (two thicknesses), etc. The point at which there are no cracks when the bent resin is viewed under a magnification of 7×, is considered the passing point and this is the T-bend number which is recorded.

The T-bend adhesion is tested at each bend by applying cellophane tape to the bend and removing it quickly. If no paint is apparent on the tape, this is the point which is considered passing.

Hardness

The method used in this study for determining hardness was pencil hardness. Pencil leads varying in hardness, (4B, 3B, 2B, B, HB, F, H, 2H, 3H) were shaped into a perfect cylinder and were pressed to the surface of the paint, on aluminum, at a 45° angle and moved with a continuous forward motion (away from the operator). The pencil that will not cut into or gouge the film, is the passing hardness for that film.

Tape Test

A piece of masking tape is put onto the film after the film has dried for 6 hours on an aluminum panel. A 50 gm weight is rolled over the tape and the tape is left on for ½ hour. The tape is then removed and the film is rated according to the degree of marring which is caused by the tape.

Water Spotting

After the film on an aluminum panel has air-dried for 6 hrs. and another has dried for 24 hours, a drop of water is placed on each. The water is allowed to evaporate and the films are then rated by determining the amount of spotting caused by the water. The rating starts at "excellent" for no mark at all to "poor" for an indentation in the film.

Tack Free time

The tack free time is the cure time needed for the coating to reach the point where it releases from the finger when pressure is applied. This is done by periodically placing a finger on the coating, applying pressure and lifting the finger. At the point that the panel falls from the finger, it is tack-free.

Gloss

Gloss is measured by a Gardner Glossometer ®. This is a measure of specular reflectance and is recorded for both 20° and 60° incident angles. The glossometer is calibrated, placed on the coated surface and % reflectance is read directly from a voltmeter connected to a photocell.

Weather-o-meter

All samples were weathered in the Atlas Dew Cycle Weather-o-meter ® for 1000 hours.

Revere Impact was carried out according to ASTM 2794-69-1974 "Resistance of Organic Coatings to the Effects of Rapid Deformation".

In the examples, the following abbreviations were used.

| | |
|---|---|
| CHDM | 1,4-cyclohexanedimethanol |
| TMPD | trimethylpentanediol |
| TMP | trimethylolpropane |
| PE | pentaerythritol |
| GLY | glycerine |
| IPA | isophthalic acid |
| TMA | trimellitic anhydride |
| COFA | dehydrated castor oil fatty acid |
| NPG | neopentylglycol |
| AD | adipic acid |

EXAMPLE 1

Preparation of a silicone modified alkyd from silanes.

A 2-liter, 3-necked, round-bottomed glass flask was equipped with an air-driven motor stirrer, thermometer, nitrogen sparge tube, viscosity cup and a cold water cooled glass condenser which surmounted a Dean-Stark type water trap for removing by-produced water. Under a nitrogen blanket this apparatus was charged with 85 gms of pentaerythritol, 15.5 gms of glycerol, 30 gms of soya fatty acid, 255.5 gms of $C_6H_5Si(OCH_3)_3$, 74.8 gms of $CH_3Si(OCH_3)_3$, 46.25 gms of distilled water and 44 gms of xylene. The silane blend was calculated to yield 203.5 gms of a 70/30 mole% $C_6H_5/CH_3$ modification at 30 weight percent silicone. The pot contents were heated to 100° C. while removing methanol. Thereafter, 111 gms of phthalic anhydride were added and the pot contents were heated at 210°–230° C. at xylene reflux while removing a total of 166.6 gms of methanol and 48 gms of water, methanol and xylene. The viscosity was monitored and the heating was carried out until a 13.0 second viscosity and an acid value of 24 was reached. The material was then cooled and xylene was added to give a 60% solids solution of clear, reddish-brown colored resin having a viscosity of 2180 centipoise (2.18 Pa.s) at 60% solids.

EXAMPLE 2

A reaction analogous to Example 1 was carried out wherein $C_6H_5Si(OCH_3)_3$ and $CH_3CH_2CH_2Si(OCH_3)_3$ were used in a 70/30 mole percent ratio to give an acid value of 13 and a viscosity of 1559 centipoise (1.559 Pa.s) at 57% solids resin.

EXAMPLE 3

A further run was made analogous to Example 1 except the silanes $C_6H_5Si(OCH_3)_3$ and $CH_3Si(OCH_3)_3$ in a mole ratio of 50/50 were used to yield a resin having an acid value of 55 and a viscosity of 3600 centipoise (3.6 Pa.s) at 60% solids resin.

EXAMPLE 4

A prior art silicone modified alkyd resin was prepared by reacting a hydroxy-containing, low molecular weight siloxane sold as Z6018 by the Dow Corning Corporation, Midland, Mich., United States, in the following manner: 140 parts of 1,4-cyclohexanedimethanol, 53 parts of trimethylolpropane, 66 parts of isophthalic acid, 220 parts of the siloxane and 218 parts of dehydrated castor oil fatty acid were charged into an apparatus similar to that described in Example 1 above.

This material was heated to 190° C. very rapidly and then to 240° C. The reaction mass was held at that temperature until an acid value of 12 was reached. The material was cooled to 170° C. and 66 parts of trimellitic anhydride was added and the temperature was held at 170° C. to 180° C. until an acid number of 50 was reached. When cooled, the resin was diluted with solvent to 60 percent solids. It was clear and colorless. This material was then compared to Examples 1, 2 and 3, of this invention, on the Gel Permeation Chromatograph (GPC). The solutions were run on a Waters 200 model, chromatograph, manufactured by Waters Co., Framingham, Mass. The graph speed was 0.1 in/min and the attenuation was 4x. The columns were polystyrene filled. Examples 1 and 4 were run at ½ weight percent in methylene chloride. Example 2 and 3 were run at ¼ weight percent in methylene chloride.

In comparing the inventive resins in Examples 1, 2 and 3 to the prior art resin, Example 4, reference should be made to FIGS. 1-4. The figure numbers correspond to the example numbers and it should be noted that the figures all have the exact same basis which is elution time in minutes on the Waters chromatograph column. Each figure shows the entire amount of elutable material injected so that all elutable material can be compared. The position of the median peaks are immaterial for this comparison. The comparison to be made is the narrow molecular weight dispersions of the materials shown in Examples 1, 2 and 3 (i.e. 5-70 min.) to the very broad molecular weight dispersion of Example 4 (i.e. 5-120 min.).

EXAMPLE 5

Comparison of prior art resins.

A composition was prepared by the process set forth in Example 1 of U.S. Pat. No. 4,035,332. This material was designated Sample A.

A second composition was prepared according to the instant invention wherein the ingredients were used which would give the same silicone to organic ratio as Sample A and wherein the organic substitution on the silicone was the same as in Sample A. This material was designated Sample B. Table I shows the formulations.

nated B. Note that the bases are the same for both figures. The figures clearly show the inventive resin as a unimodal peak whereas the prior art material shows bimodal peaks.

EXAMPLE 6

Comparison of prior art

A resin composition was prepared in the following manner: Into a flask equipped as in Example 1, there was placed 78 gms of NPG, 36.5 gms of AD, 48.0 gms of TMA and 81 gms of xylene. This mixture was heated at reflux (about 139° C.) while water azeotroped. This heating was continued until an acid number of 80 was obtained. To this mixture there was added 83.66 gms of a commercially available siloxane containing 67 mole% $C_6H_5(CH_3)SiO$ and 33 mole% of $C_6H_5SiO_{3/2}$. This mixture was heated to 165° C. while methanol was removed from the reaction mixture. The reaction mixture was then cooled to 110° C. and 100 gms of 2-butoxyethanol was added. Upon additional heating at 150° C. the color the reaction mass turned from clear orange color to clear yellow. This material was designated C.

A second resin was prepared according to this invention. The material contained the same ingredients as in C, above except the 67/33 mole% siloxane was obtained from 67 mole%. $CH_6H_5(CH_3)Si(OCH_3)_2$ and 33 mole% of $C_6H_5Si(OCH_3)_3$. The resin was prepared by mixing together 78.0 gms of NPG, 36.5 gms of AD, 48.0 gms of TMA, 35.0 gms of xylene, 35.3 gms of $C_6H_5Si(OCH_3)_3$, 64.8 gms of $C_6H_5(CH_3)Si(OCH_3)_2$ and 6.4 gms of water. This mixture was heated to reflux and methanol was removed. There was removed 76 gms of methanol, by-produced water and a small amount of xylene. The reaction was heated until the acid number was 45. The maximum temperature during the reaction was 165° C. After cooling to 100° C., 100 gms of 2-butoxyethanol was added. This resin was designated D.

Figure 7:
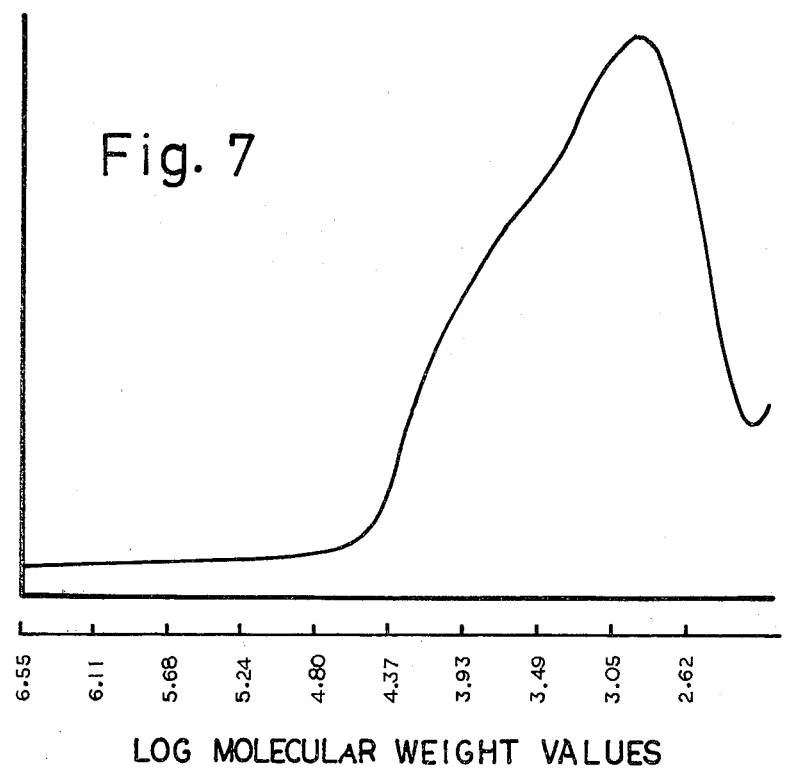
Figure 8:
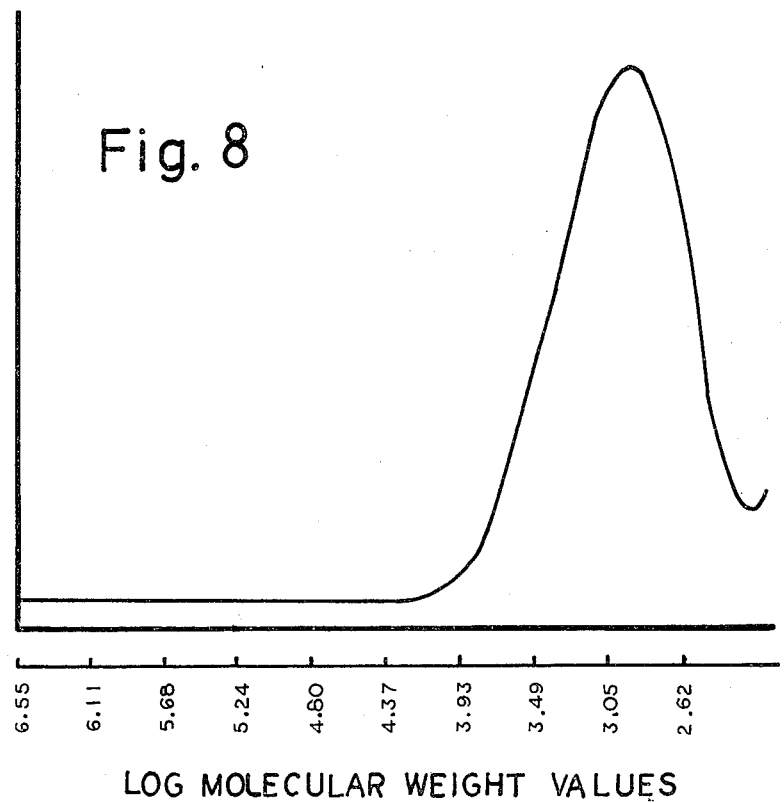

The two resins C and D were compared by GPC as in Example 5 above, wherein the samples were 1% in tetrahydrofuran and the flow rate was 1 ml/min. FIGS. 7 and 8 show the bimodal/unimodal peak affect as was observed for the previous example, clearly showing that a different material is obtained by the process of this invention.

TABLE I

| | | | | | | | | |
|---|---|---|---|---|---|---|---|---|
| Formulation of silicone alkyd resins for comparison purposes | | | | | | | | |
| Ref | gms NPG | gms AD | gms TMA | gms xylene | gms $H_2O$ | silicone | mole ratio of $C_6H_5SiO_{3/2}$ to $C_6H_5(CH_3)SiO_{\frac{1}{2}}$ | Acid # |
| A | 78 | 36.5 | 48 | 81.25 | 0 | $C_6H_5Si(OSiOCH_3)_3$ with $CH_3$ and $C_6H_5$ substituents | 25/75 | 36 |
| B | 78 | 36.5 | 48 | 81.0 | 14.5 | $C_6H_5Si(OCH)_3$ $C_6H_5(CH_3)Si(OCH_3)_2$ | 25/75 | 38 |

All of the materials of Sample B were mixed together and heated at 91° C. for 4 hours while azeotroping by-produced water. It was then heated over a period of 4 hours from 100° C. to about 140° C. whereupon 30 gms of xylene was added. It was then heated to 175° C. reflux until an acid number of 46 was reached whereupon it was cooled and 100 gms of butyl carbitol was added and the final acid number was 38.

The two resins were compared by GPC as in Example 4 above. The samples were 1% resin in tetrahydrofuran. The flow rate was 1 ml/min. FIGS. 5 and 6 are scale drawings of the chromatograms. FIG. 5 is the material designated A and FIG. 6 is the material desig-

EXAMPLE 7

Paint preparation using an inventive resin.

An apparatus similar to that used in Example 1 was used and the following ingredients were used. CHDM (140 gms), TMP (53 gms), COFA 218.7 gms, 345.6 gms of a 70/30 mole% silane mixture of $C_6H_5Si(OCH_3)_3$ and $CH_3(CH_2)_2Si(OCH_3)_3$ and 41.92 gms of water. This mixture was heated while methanol was removed to 100° C. At this point, 66.7 gms of IPA was added and the reaction mixture was heated to 230° C. until an acid value of 11 was obtained. The resin was cooled to 160° C. and 66.7 gms of TMA was added. This material was cooked at 170° C. to an acid value of 55, cooled to 80° C. and 145 gms of butyl cellosolve was added. This material was formulated into a paint in the following manner:

Into a standard ball milling apparatus was weighed 54.7 gms of Rutile TiO$_2$ pigment, 12.8 gms of Shepards Blue #3 pigment, 85.8 gms of solids of the above prepared resin, 6.2 gms of NH$_4$OH, 17.3 gms of 2-butoxyethanol and 104 gms of distilled water. This mixture was ball-milled for 16 hours. There was then added 94 gms of water, 0.8 gms of Cobalt Hydrocure ® (Mooney Chemical, Cleveland, Ohio, United States) (6% Co) catalyst and 0.4 gms of manganese Hydrocure (6% Mn) and this material was then ball-milled for 45 minutes and then filtered through a paint filter. The viscosity of this paint was then adjusted to 9 seconds in a #4 Zahn cup using an 86/14 weight percent water/2-butoxyethanol mixture as a diluent.

The paint was coated on aluminum panels and allowed to air dry until the film was tack free to the finger touch. The resin was a 70/30 mole% C$_6$H$_5$SiO$_{3/2}$/CH$_3$(CH$_2$)$_2$SiO$_{3/2}$ modified alkyd which after formulating into a paint had a viscosity of 9 seconds (#4 Zahn cup) and a pH=8.9. The tack free time was 2½ hours for a film thickness of 1.2 mils. The film had a pencil hardness of 3B, a flex and adhesion T-bend of 2T/2T, a 20° gloss of 66 and a 60° gloss of 80.

EXAMPLE 8

In a manner similar to Example 1, several more resins were prepared to show the use of other silane monomers and other alkyd precursor polyols and acids. (See Table II for formulations and Table III for paint film data). The paints and paint films were prepared similar to Example 7.

TABLE II

Resin Formulations

| | Alkyd Formulations/gms | | | | | | | | Silicone Formulation/gms | | |
|---|---|---|---|---|---|---|---|---|---|---|---|
| Ref | CHDM | TMPD | TMP | PE | GLY | IPA | TMA | COFA | Type | mole % | gms |
| A | 140 | | 53 | | | 66.7 | 66.7 | 218.7 | C$_6$H$_5$Si(OCH$_3$)$_3$ | 70 | 255.4 |
| | | | | | | | | | CH$_3$(CH$_2$)$_2$Si(OCH$_3$)$_3$ | 30 | 90.2 |
| B | 140 | | 53 | | | 66.7 | 66.7 | 218.7 | (C$_6$H$_5$)$_2$Si(OCH$_3$)$_2$ | 80 | 246.4 |
| | | | | | | | | | CH$_3$Si(OCH$_3$)$_3$ | 20 | 35.4 |
| C | 98.8 | | | 6.81 | | 33.35 | 33.35 | 109.4 | (C$_6$H$_5$)$_2$Si(OCH$_3$)$_2$ | 80 | 124.4 |
| | | | | | | | | | CH$_3$Si(OCH$_3$)$_3$ | 20 | 17.3 |
| D | 61.0 | | | | 6.13 | 22.23 | 22.23 | 72.9 | (C$_6$H$_5$)$_2$Si(OCH$_3$)$_2$ | 80 | 83.3 |
| | | | | | | | | | CH$_3$Si(OCH$_3$)$_3$ | 20 | 11.55 |
| E | 50.27 | 17.67 | | | | 22.23 | 22.23 | 72.9 | (C$_6$H$_5$)$_2$Si(OCH$_3$)$_2$ | 80 | 83.3 |
| | | | | | | | | | CH$_3$Si(OCH$_3$)$_3$ | 20 | 11.55 |

| Ref. | gms Amt H$_2$O | Hrs. Cook | Appearance | Acid Value | (Pa · s) cps Visc. | % solids |
|---|---|---|---|---|---|---|
| A | 41.03 | 16½ | hazy | 47 | (28.08) 23080 | 83 |
| B | 10.2 | 12 | hazy | 46 | (6.28) 6280 | 82 |
| C | 5.1 | 9½ | hazy | 50 | (7.68) 7680 | 83 |
| D | 3.4 | 7¾ | hazy | 51 | (5.64) 5640 | 83 |
| E | 3.4 | 10½ | hazy | 51 | (4.0) 4000 | 82 |

TABLE III

Paint and Paint Film Properties

| | | | Films | | | | Paint Solution | |
|---|---|---|---|---|---|---|---|---|
| Ref. | Tack free time at room temp./hrs | thickness/ mils | T-Bend Flex/Adhesion | | Reverse Impact/in.lbs. | pencil Hardness | Solids | pH |
| A | 5½ | 1.29 | OT | OT | 5 | 4B | 80 | 9.3 |
| B | 7½ | 0.99 | OT | OT | 5 | 4B | 80 | 9.2 |
| C | <18 | 0.98 | OT | OT | 5 | 4B | 80 | 9.1 |
| D | <18 | 0.98 | OT | OT | 5 | 4B | 80 | 9.0 |
| E | <18 | 1.20 | OT | OT | 5 | 4B | 80 | 8.8 |

That which is claimed is:

1. A process for producing a resin which comprises contacting and reacting essentially simultaneously
   (A) an aliphatic polyhydric alcohol or a mixture of aliphatic polyhydric alcohols;
   (B) a polybasic carboxylic acid or an anhydride or mixtures thereof;
   (C) an organosilane or a mixture of organosilanes having the general formula

   $R_n Si(OR')_{4-n}$ wherein R is selected from a group consisting of phenyl, methyl, ethyl, propyl and butyl radicals; R' is an alkyl radical of 1-4 carbon atoms and n has a value of 1 or 2 and,
   (D) at least a stoichiometric amount of water based on the amount of —(OR') present in the mixture, at a temperature greater than 25° C. for a period of time sufficient to produce a resin with an acid value of 10–150.

2. A process as claimed in claim 1 wherein the polyhydric alcohols are selected from a group consisting of pentaerythritol, trimethylolethane, trimethylolpropane, 2,3-dimethyl-1,3-propanediol, trimethylpentanediol, ethyleneglycol, propyleneglycol, trimethyleneglycol, glycerin, 1,4-cyclohexanediol, tetramethyleneglycol, 1,4-cyclohexanedimethanol, hexamethylene diol, 2-methyl-2-ethyl-1,3-propanediol, 2,2,7,7-tetramethyl-1,8-octamethylenediol, 1,2,6-hexanetriol, sorbitol, diglycerine, tris(2-hydroxyethyl)isocyanurate and mixtures thereof.

3. A process as claimed in claim 2 wherein the polyhydric alcohols are selected from a group consisting of 1,4-cyclohexanedimethanol, trimethylpentanediol, trimethylolpropane, pentaerythritol, glycerine and mixtures thereof.

4. A process as claimed in claim 1 wherein the polybasic carboxylic acids and anhydrides are selected from a group consisting of phthalic acid, phthalic anhydride, terephthalic acid, isophthalic acid, 2,6-naphthalenedicarboxylic acid, succinic acid, glutaric acid, adipic acid, sebacic acid, tetrahydrophthalic acid, tetrahydrophthalic anhydride, trimellitic anhydride, hexahydrophthalic anhydride,

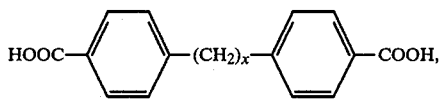

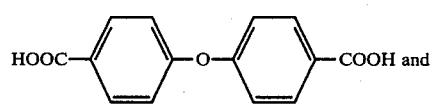

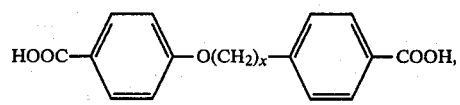

where x is an integer of 1 to 10, and mixtures thereof.

5. A process as claimed in claim 4 wherein the polybasic carboxylic acid, isophthalic acid, is mixed with trimellitic anhydride.

6. A process as claimed in claim 1 wherein there is also present a drying oil fatty acid.

7. A process as claimed in claim 6 wherein the drying oil fatty acid is selected from tall oil fatty acid, soybean oil fatty acid, castor oil fatty acid, dehydrated castor oil fatty acid, coconut oil fatty acid, linseed oil fatty acid, tung oil fatty acid, fish oil fatty acid, olive oil fatty acid and cotton seed oil fatty acid.

8. A process as claimed in claim 7 wherein the drying oil fatty acid is dehydrated castor oil fatty acid.

9. A process as claimed in claim 1 wherein component (C) is a mixture of $C_6H_5Si(OCH_3)_3$ and $CH_3CH_2CH_2Si(OCH_3)_3$.

10. A process as claimed in claim 1 wherein component (C) is a mixture of $C_6H_5Si(OCH_3)_3$ and $(C_6H_5)_2Si(OCH_3)_2$.

11. A process as claimed in claim 1 wherein component (C) is a mixture of $C_6H_5(CH_3)Si(OCH_3)_2$ and $CH_3Si(OCH_3)_3$.

12. A process as claimed in claim 1 wherein component (C) is a mixture of $C_6H_5Si(OCH_3)_3$ and $CH_3Si(OCH_3)_3$.

13. A process as claimed in claim 1 wherein component (A) is a mixture of 1,4-cyclohexanedimethanol and trimethylolpropane; component (B) is a mixture of isophthalic acid and trimellitic anhydride and component (C) is a mixture of $C_6H_5Si(OCH_3)_3$ and $CH_3CH_2CH_2Si(OCH_3)_3$.

14. A process as claimed in claim 13 wherein in component (C), the mixture contains 70 mole percent $C_6H_5Si(OCH_3)_3$ and 30 mole percent $CH_3CH_2CH_2Si(OCH_3)_3$.

15. A resin produced by the process as claimed in claim 1.

16. A resin as claimed in claim 15 wherein there is an organic solvent present.

17. A resin as claimed in claim 15 wherein there is water present as a carrier.

18. A resin as claimed in claim 15 wherein the polyhydric alcohols are selected from a group consisting of pentaerythritol, trimethylolethane, trimethylolpropane, 2,3-dimethyl-1,3-propanediol, trimethylpentanediol, ethyleneglycol, propyleneglycol, trimethyleneglycol, glycerin, 1,4-cyclohexanediol, tetramethyleneglycol, 1,4-cyclohexanedimethanol, hexamethylene diol, 2-methyl-2-ethyl-1,3-propanediol, 2,2,7,7,-tetramethyl-1,8-octamethylenediol, 1,2,6-hexanetriol, sorbitol, diglycerine, tris(2-hydroxyethyl)isocyanurate and mixtures thereof.

19. A resin as claimed in claim 18 wherein the polyhydric alcohols are selected from a group consisting of 1,4-cyclohexanedimethanol, trimethylpentanediol, trimethylolpropane, pentaerythritol, glycerine and mixtures thereof.

20. A resin as claimed in claim 15 wherein the polybasic carboxylic acids and anhydrides are selected from a group consisting of phthalic acid, phthalic anhydride, terephthalic acid, isophthalic acid, 2,6-naphthalenedicarboxylic acid, succinic acid, glutaric acid, adipic acid, sebacic acid, tetrahydrophthalic acid, tetrahydrophthalic anhydride, trimellitic anhydride, hexahydrophthalic anhydride,

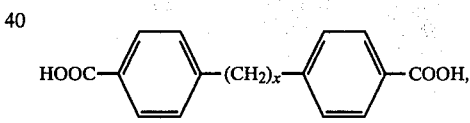

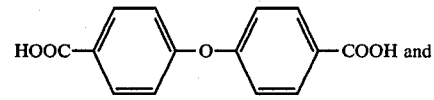

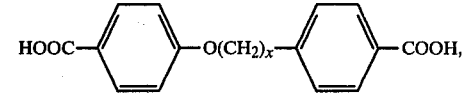

where x is an integer of 1 to 10, and mixtures thereof.

21. A resin as claimed in claim 20 wherein the polybasic carboxylic acid, isophthalic acid, is mixed with trimellitic anhydride.

22. A resin as claimed in claim 15 wherein there is also present a drying oil fatty acid.

23. A resin as claimed in claim 22 wherein the drying oil fatty acid is selected from tall oil fatty acid, soybean oil fatty acid, castor oil fatty acid, dehydrated castor oil fatty acid, coconut oil fatty acid, linseed oil fatty acid, tung oil fatty acid, fish oil fatty acid, olive oil fatty acid and cotton seed oil fatty acid.

24. A resin as claimed in claim 23 wherein the drying oil fatty acid is dehydrated castor oil fatty acid.

25. A resin as claimed in claim 15 wherein component (C) is a mixture of $C_6H_5SiO_{3/2}$ units and $CH_3CH_2CH_2SiO_{3/2}$ units.

26. A resin as claimed in claim 15 wherein component (C) is a mixture of $C_6H_5SiO_{3/2}$ units and $(C_6H_5)_2SiO$ units.

27. A resin as claimed in claim 15 wherein component (C) is a mixture of $C_6H_5(CH_3)SiO$ units and $CH_3SiO_{3/2}$ units.

28. A resin as claimed in claim 15 wherein component (C) is a mixture of $C_6H_5SiO_{3/2}$ units and $CH_3SiO_{3/2}$ units.

29. A resin as claimed in claim 15 wherein component (A) is a mixture of 1,4-cyclohexanedimethanol and trimethylolpropane; component (B) is a mixture of isophthalic acid and trimellitic anhydride and component (C) is a mixture of $C_6H_5SiO_{3/2}$ units and $CH_3CH_2CH_2SiO_{3/2}$ units.

30. A resin as claimed in claim 29 wherein in component (C), the mixture contains 70 mole percent $C_6H_5SiO_{3/2}$ units and 30 mole percent $CH_3CH_2CH_2SiO_{3/2}$.

31. A water reducible resin composition comprising
(a) from 20 to 90 parts by weight of a resin which is produced by contacting and reacting essentially simultaneously
 (i) an aliphatic polyhydric alcohol or a mixture of aliphatic polyhydric alcohols:
 (ii) a polybasic carboxylic acid or an anhydride or mixtures thereof;
 (iii) an organosilane or a mixture of organosilanes having the general formula $$R_nSi(OR')_{4-n}$$

wherein R is selected from the group consisting of phenyl, methyl, ethyl, propyl and butyl radicals; R' is an alkyl radical of 1-4 carbon atoms and n has a value of 1 or 2 and,
 (iv) at least a stoichiometric amount of water based on the amount of —(OR') present in the mixture, at a temperature greater than 25° C. for a period of time sufficient to produce a resin with an acid value of 10–150,
(b) 80–10 parts by weight of a water-miscible organic solvent selected from a group consisting of aliphatic alcohols, glycols, monoalkyl ethers of glycols and ketones; and
(c) a basic compound selected from the group consisting of trimethylamine, triethylamine, dipropylamine, dimethylethanolamine, diethylethanolamine, triethanolamine and ammonia in an amount sufficient to reduce the acid value of component (a) to below 10.

32. A resin composition as claimed in claim 31 wherein component (a)(i) is selected from a group consisting of pentaerythritol, trimethylolethane, trimethylolpropane, 2,3-dimethyl-1,3-propanediol, trimethylpentanediol, ethyleneglycol, propyleneglycol, trimethyleneglycol, glycerin, 1,4-cyclohexanediol, tetramethyleneglycol, 1,4-cyclohexanedimethanol, hexamethylene diol, 2-methyl-2-ethyl-1,3-propanediol, 2,2,7,7-tetramethyl-1,8-octamethylenediol, 1,2,6-hexanetriol, sorbitol, diglycerine, tris(2-hydroxyethyl)isocyanurate and mixtures thereof.

33. A resin composition as claimed in claim 32 wherein component (a)(i) is selected froom a group consisting of 1,4-cyclohexanedimethanol, trimethylpentanediol, trimethylolpropane, pentaerythritol, glycerine and mixtures thereof.

34. A resin composition as claimed in claim 31 wherein component (a)(ii) is selected from a group consisting of phthalic acid, phthalic anhydride, terephthalic acid, isophthalic acid, 2,6-naphthalenedicarboxylic acid, succinic acid, glutaric acid, adipic acid, sebacic acid, tetrahydrophthalic acid, tetrahydrophthalic anhydride, trimellitic anhydride, hexahydrophthalic anhydride,

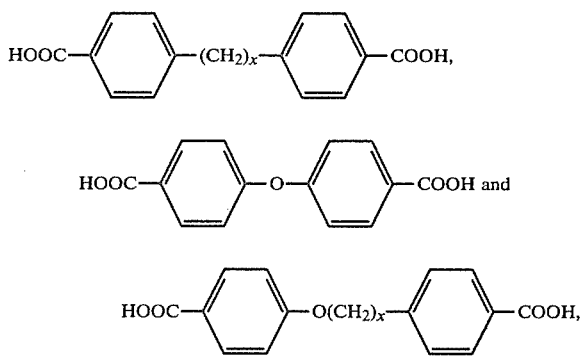

where x is an integer of 1 to 10, and mixtures thereof.

35. A resin composition as claimed in claim 34 wherein the polybasic carboxylic acid, isophthalic acid, is mixed with trimellitic anhydride.

36. A resin composition as claimed in claim 31 wherein there is also present a drying oil fatty acid.

37. A resin composition as claimed in claim 36 wherein the drying oil fatty acid is selected from tall oil fatty acid, soybean oil fatty acid, castor oil fatty acid, dehydrated castor oil fatty acid, coconut oil fatty acid, linseed oil fatty acid, tung oil fatty acid, fish oil fatty acid, olive oil fatty acid and cotton seed oil fatty acid.

38. A resin composition as claimed in claim 37 wherein the drying oil fatty acid is dehydrated castor oil fatty acid.

39. A resin composition as claimed in claim 31 wherein component (a)(iii) is a mixture of $C_6H_5SiO_{3/2}$ units and $CH_3CH_2CH_2SiO_{3/2}$ units.

40. A resin composition as claimed in claim 31 wherein component (a)(iii) is a mixture of $C_6H_5SiO_{3/2}$ units and $(C_6H_5)_2SiO$ units.

41. A resin composition as claimed in claim 31 wherein component (a)(iii) is a mixture of $C_6H_5(CH_3)SiO$ units and $CH_3SiO_{3/2}$ units.

42. A resin composition as claimed in claim 31 wherein component (a)(iii) is a mixture of $C_6H_5SiO_{3/2}$ units and $CH_3SiO_{3/2}$ units.

43. A resin composition as claimed in claim 31 wherein component (a)(i) is a mixture of 1,4-cyclohexanedimethanol and trimethylolpropane; component (a)(ii) is a mixture of isophthalic acid and trimellitic anhydride and component (a)(iii) is a mixture of $C_6H_5SiO_{3/2}$ units and $CH_3CH_2CH_2SiO_{3/2}$ units.

44. A resin composition as claimed in claim 43 wherein in component (a)(iii), the mixture contains 70 mole percent $C_6H_5SiO_{3/1}$ units and 30 mole percent $CH_3CH_2CH_2SiO_{3/2}$ units.

* * * * *

UNITED STATES PATENT AND TRADEMARK OFFICE
CERTIFICATE OF CORRECTION

PATENT NO. : 4,377,676
DATED : Mar. 22, 1983
INVENTOR(S) : Laura A. Gauthier, Gary E. LeGrow It is certified that error appears in the above-identified patent and that said Letters Patent is hereby corrected as shown below:

In Column 4, line 47, "$C_6H_5SI(OCH_3)_3$," should read -- $C_6H_5Si(OCH_3)_3$, --.

In Column 10, line 26, "$CH_6H_5(CH_3)Si(OCH_3)_2$" should read -- $C_6H_5(CH_3)Si(OCH_3)_2$ --.

Signed and Sealed this

Twenty-seventh Day of November 1984

[SEAL]

Attest:

GERALD J. MOSSINGHOFF

Attesting Officer  Commissioner of Patents and Trademarks